D. Dick & O. W. Preston Jr.
Car-Brake.
Nº 72985. Patented Jan. 7, 1868.
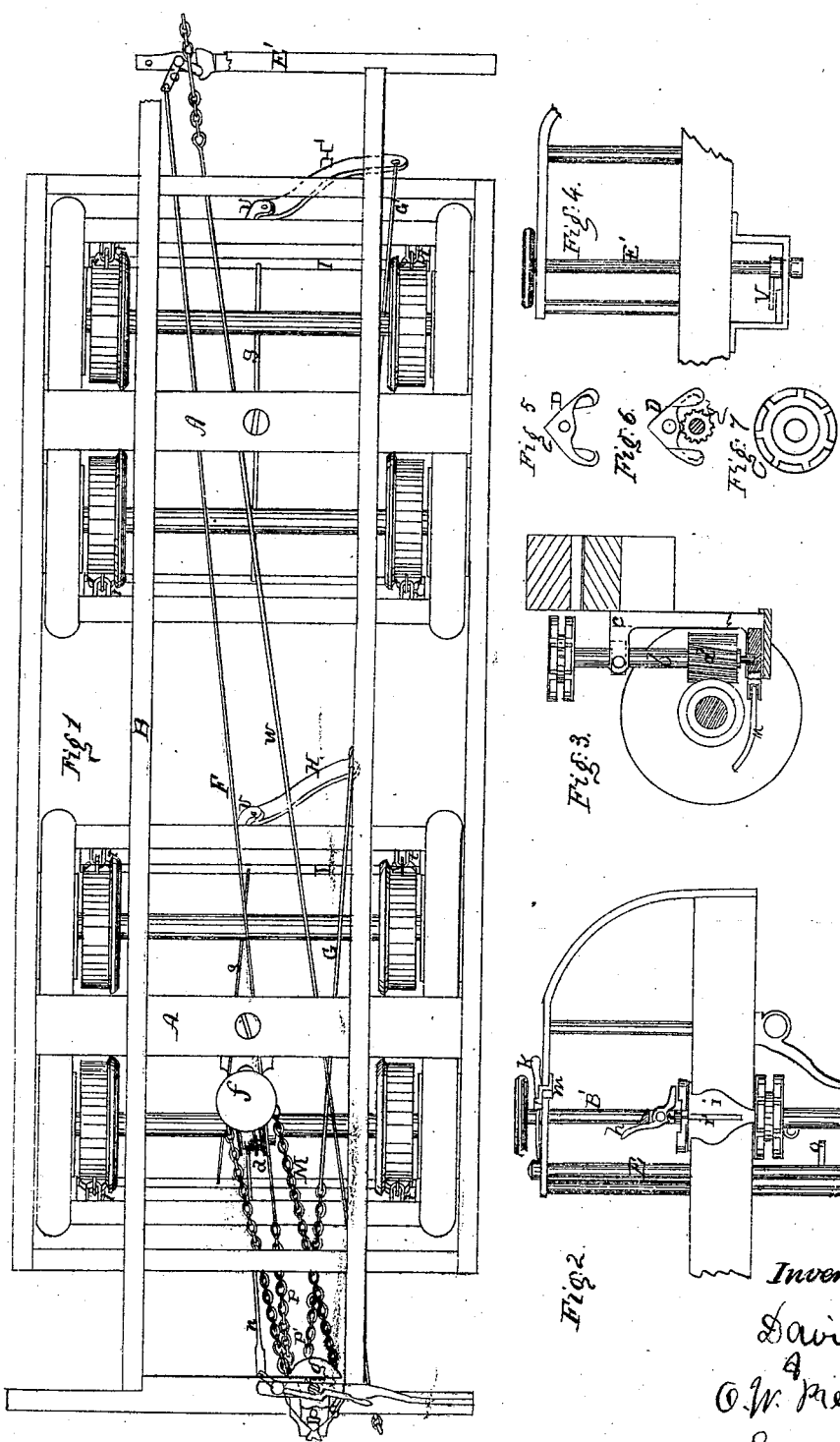
Witnesses
Jno. A. Ellis.
Jas. V. White.
Inventors
David Dick
& O. W. Preston
by
J. L. Alexander
Atty

UNITED STATES PATENT OFFICE.

DAVID DICK AND O. W. PRESTON, JR., OF CORNING, NEW YORK.

IMPROVED CAR-BRAKE.

Specification forming part of Letters Patent No. 72,985, dated January 7, 1868.

*To all whom it may concern:*

Be it known that we, DAVID DICK and O. W. PRESTON, Jr., of the town of Corning, in the county of Steuben and State of New York, have invented certain new and useful Improvements in Railway-Car Brakes; and we do hereby declare that the following is a full, clear, and exact description thereof, reference being had to the accompanying drawings, and to the letters of reference marked thereon, which form a part of this specification, in which—

Figure 1 is a plan with the ordinary hand-gear broken away. Fig. 2 is a front elevation. Fig. 3 is a section of the brake device; Fig. 4, a rear elevation; Fig. 5, a plan of the double dog; Fig. 6, an inverted view of the double dog and spur; and Fig. 7 represents a plan of the pitch-chain wheel with its top removed.

The nature of this invention consists in a combination of devices so arranged that the brakes may be applied to a single or to a whole train of cars, either by the force of their own motion or by hand-power, substantially as hereinafter described.

To enable others skilled in the art to make and use our invention, we will now make known its construction and mode of operation.

A A represent two common trucks secured to the ordinary frame B. *a* represents a worm or endless screw on the front axle; but we would observe that this worm can be placed either upon one or more of the axles without altering or changing the principle of our invention.

*b* represents a vertical rocking-shaft supported by means of the hanger or bracket *c*. Said hanger is secured to the center cross-piece of the truck. *d* is a worm-wheel on the vertical shaft *b* which gears into the worm on the axle.

It will be remarked that the lower end of hanger *c* is turned at right angles with its body, so as to form a chamber or sliding bed for slide *e*. Upon this slide the vertical rocking-shaft *b* rests, as fully represented in Fig. 3. On the top of this shaft is the pitch-chain wheel *f*, the object of which will be clearly seen hereafter.

B' represents the ordinary chain-bar, which is provided with the pitch-chain wheel *g*, also with the spur-wheel *g'*, seen in Fig. 6. *h* is a kicker, pivoted in a slot in chain-shaft or bar, as fully shown in Fig. 2. The peculiar office of this device will be presently more apparent.

*i* represents a bracket, in which is secured spring *i'*, Fig. 2. This spring is provided with a metal head with a notch cut in it, as shown at Fig. 1.

D is a double dog, pivoted on the bracket between the spur-wheel *g'* and spring *i'*. The shape of this dog is somewhat like the shape of a heart, its apex fitting, when necessary, into the notch in the head of spring *i*, Fig. 1. The manner of forming the dog is clearly shown in Figs. 5 and 6. It should be remarked, however, that it is provided with catch-teeth on its inner surface just beneath the projecting sides. By means of these teeth or cogs the spur-wheel operates the dog D.

E represents an auxiliary chain-bar, provided at its upper end with the lever *k*, and at its lower end with the arm *l*. *m* is a latch, for the purpose of retaining or holding the lever *k* in place. *n* represents a connecting-bar which unites the arm *l* to the slide *e*. Thus it will be seen by means of lever *k*, the brakes may be either applied or relieved by throwing the worm-wheel in or out of gear.

*o* represents an arm on the auxiliary chain-bar E, to which are attached a few links of chain *p*, as seen in Fig. 1. *p'* is a similar chain attached to the main chain-bar B' by means of a staple or otherwise. The chain *p* is secured to the metal rod F which extends to the opposite end of the car, and there secured onto arm *o'* of chain-bar E'.

G G' are metal rods which connect brake-levers H H', as shown in Fig. 1. The chain *p'* connects these metal rods to the chain-bar *b*.

I I represent the brake-bars, to which are secured the metal brakes *t t*. Said brakes swing by means of staples passing through their upper ends and then driven in the under side of the frame of the trucks. The brake-bars I I of the same trucks are connected by metal rod S, or this rod, as shown in the drawings, may be secured at one end to the brake-lever, and at the opposite end to the brake-bar. *u u* represent brackets on the brake-bars I I. In these brackets are pivoted the levers H H', as shown in Fig. 1.

*v* is an arm on the chain-bar E'. *w* represents a metal rod, and may be denominated the "engineer's connection," as by it he can put all the brakes down whenever occasion requires. In order to do this it will, of course, be necessary to connect the rod of each separate car together, and also to place the front rod within reach of the engineer. One end of the rod $w$ is provided with a short chain, upon which is a link of sufficient size to slip over the arm $v$.

We would observe that we do not confine ourselves to the chain-connection, as there are other obvious methods of accomplishing the same result. It remains now only to remark that the two pitch-chain wheels $f$ $g$ are connected by chain-loop M.

The operation of our invention is as follows: First, throw back the hand-lever $k$, the kicker $h$ out of gear with the dog D, put said dog in gear with spur-wheel $g'$, and the brakes may be used in the ordinary manner; second, throw the hand-lever and dog out of gear and the kicker down. In this position, while the cars are in motion, by turning the hand-lever $k$ in from either end of the cars, the worm $a$ will be brought into gear with the worm-wheel $d$, putting in motion the vertical chain-bar, and thereby draw the brakes upon the wheels and bind them; third, by drawing the engineer's connection at either end of a train, the worm-wheel $d$ will be brought in gear with the endless screw or worm $a$, thereby braking all the wheels throughout the train; fourth, if the train of cars should by accident become separated, the brakes of the cars so separating will be put in action by the cars leaving the engineer's connection attached to the forward part of the train.

Having thus fully described our invention, what we claim, and desire to secure by Letters Patent, is—

1. The dog D as constructed, in combination with spring $i$ operating conjointly, substantially as set forth.

2. In combination with dog D and spring $i$, we claim kicker $h$ and spur-wheel $g'$, substantially as described.

3. The engineer's connecting-rod W, when in combination with the brake apparatus, substantially in the manner specified.

4. The pitch-chain wheels $f$ $g$ and chain-loop M, in combination with rocking-shaft $b$, chain-bar B', and braking devices, substantially as described.

5. We claim rocking-shaft $b$, worm-wheel $d$, slide $e$, connecting-rod $u$, chain-bars B' E, and engineer's connecting-rod W, all combined substantially in the manner and for the purpose set forth.

In testimony that we claim the foregoing as our own we affix our signatures in presence of two witnesses.

DAVID DICK.
O. W. PRESTON, Jr.

Witnesses:
 Geo. L. Davy,
 J. F. Jones.